United States Patent
Hertz et al.

(10) Patent No.: US 10,833,615 B2
(45) Date of Patent: Nov. 10, 2020

(54) METHODS FOR CONTROLLING A VOLTAGE PRESENT AT AN ELECTRIC FAN

(71) Applicants: Dirk Hertz, Fichtenhof (DE); Florian Ringer, Vilseck (DE); Marco Schönenberg, Amberg (DE)

(72) Inventors: Dirk Hertz, Fichtenhof (DE); Florian Ringer, Vilseck (DE); Marco Schönenberg, Amberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 45 days.

(21) Appl. No.: 16/195,060

(22) Filed: Nov. 19, 2018

(65) Prior Publication Data
US 2019/0165707 A1 May 30, 2019

(30) Foreign Application Priority Data
Nov. 27, 2017 (DE) .......................... 10 2017 221 172

(51) Int. Cl.
*H02P 7/29* (2016.01)
*H02P 7/282* (2016.01)
(Continued)

(52) U.S. Cl.
CPC ................ *H02P 7/29* (2013.01); *F04D 25/08* (2013.01); *H02M 3/155* (2013.01); *H02P 1/18* (2013.01); *H02P 7/282* (2013.01)

(58) Field of Classification Search
CPC .... H02P 7/29; H02P 1/18; H02P 7/282; F04D 25/08; H02M 3/155
(Continued)

(56) References Cited

U.S. PATENT DOCUMENTS 4,847,544 A * 7/1989 Goldberg ................. H02P 8/12
  318/696
5,365,422 A * 11/1994 Close ................ H02M 7/53871
  318/811

(Continued)

FOREIGN PATENT DOCUMENTS

AT    507203 A4    3/2010
CN    1163022 A    10/1997
(Continued)

OTHER PUBLICATIONS

German Office Action for German Application No. 102017221172.5, dated Aug. 21, 2018.
(Continued)

*Primary Examiner* — Kawing Chan
(74) *Attorney, Agent, or Firm* — Lempia Summerfield Katz LLC

(57) ABSTRACT

Methods for controlling a voltage present at an electric fan during a startup of the fan are disclosed herein. The fan serves to generate a flow of air for cooling a device. The method includes applying an output voltage of a power supply, which serves to supply voltage to the device, to the fan; and switching on and switching off the output voltage of the power supply applied to the fan by a switch pulse-width-modulated-controlled by a control unit so that the Root Mean Square value of the current flowing through the fan is less than a startup current of the fan.

18 Claims, 2 Drawing Sheets

(51) Int. Cl.
  *H02P 1/18* (2006.01)
  *H02M 3/155* (2006.01)
  *F04D 25/08* (2006.01)

(58) Field of Classification Search
  USPC .............................................................. 318/3
  See application file for complete search history.

(56) References Cited

U.S. PATENT DOCUMENTS

| | | | |
|---|---|---|---|
| 6,317,458 B1* | 11/2001 | Boggs | H02M 3/156 |
| | | | 323/276 |
| 6,326,762 B1* | 12/2001 | Jiang | H02P 3/18 |
| | | | 318/799 |
| 6,979,964 B1 | 12/2005 | Roe | |
| 7,233,121 B2* | 6/2007 | Wu | H02P 6/15 |
| | | | 318/400.17 |
| 7,551,411 B2* | 6/2009 | Woods | B24B 55/00 |
| | | | 361/33 |
| 2007/0097566 A1* | 5/2007 | Woods | H02P 25/14 |
| | | | 361/33 |
| 2007/0159861 A1 | 7/2007 | Meier | |
| 2014/0239864 A1* | 8/2014 | Hansen | H02P 7/06 |
| | | | 318/400.35 |
| 2014/0312869 A1* | 10/2014 | Zulim | H02B 1/32 |
| | | | 323/282 |
| 2015/0236632 A1* | 8/2015 | Marohl | H02P 21/22 |
| | | | 318/722 |
| 2016/0197540 A1* | 7/2016 | Shen | H02K 17/16 |
| | | | 310/125 |
| 2019/0356253 A1* | 11/2019 | Kruzel | H02P 25/032 |

FOREIGN PATENT DOCUMENTS

| | | |
|---|---|---|
| CN | 201916228 U | 8/2011 |
| DE | 10346535 A1 | 5/2005 |
| DE | 102004017292 A1 | 10/2005 |
| DE | 102005011578 A1 | 9/2006 |
| DE | 102009029106 A1 | 3/2011 |
| WO | WO2005041394 A1 | 5/2005 |
| WO | WO2006097390 A1 | 9/2006 |
| WO | WO2011026772 A2 | 3/2011 |

OTHER PUBLICATIONS

European Search Report for European Patent Application No. 18203360.5-1202 dated Apr. 5, 2019.
Chinese Office Action for Chinese Application No. 2018114235602 dated Dec. 9, 2019, with English translation.

* cited by examiner

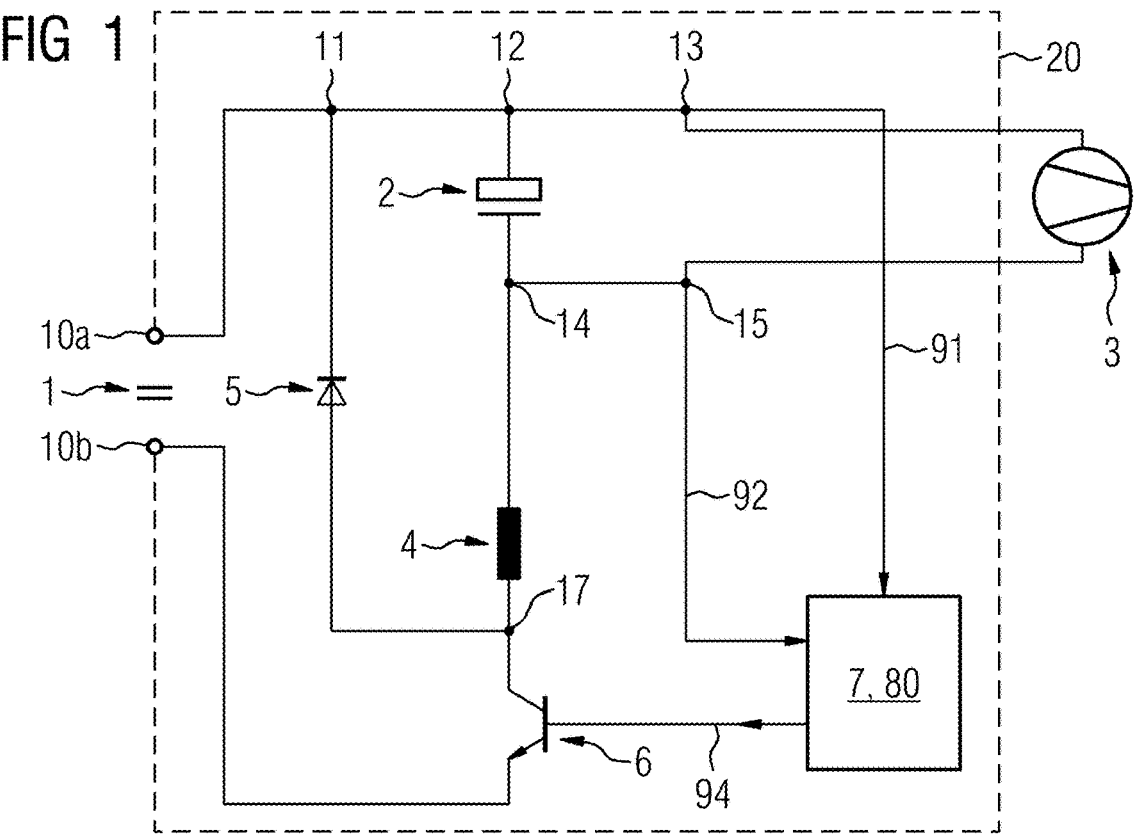
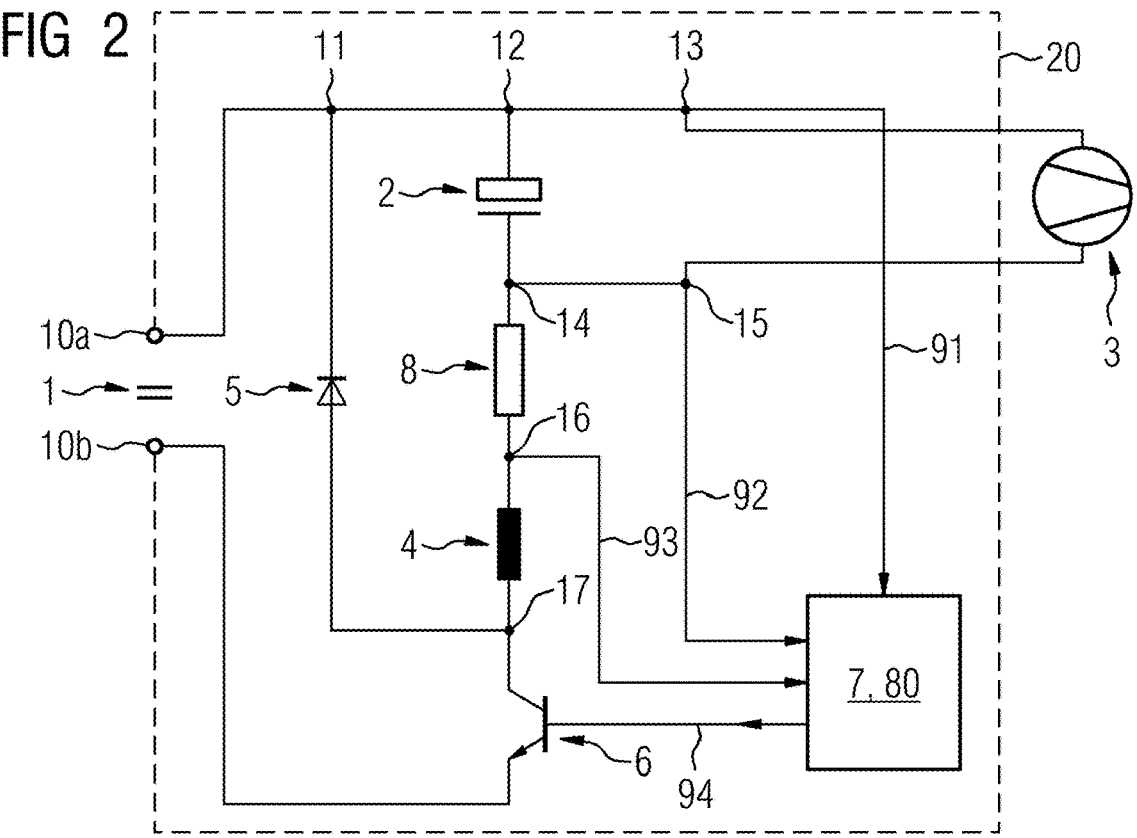

METHODS FOR CONTROLLING A VOLTAGE PRESENT AT AN ELECTRIC FAN

The application claims the benefit of German Patent Application No. DE 10 2017 221 172.5, filed Nov. 27, 2017, which is hereby incorporated by reference in its entirety.

TECHNICAL FIELD

The present disclosure relates to a method for controlling a voltage present at an electric fan. The disclosure likewise relates to a computer program product with which the operating method is able to be carried out. The disclosure also relates to a corresponding circuit arrangement. The disclosure also relates to a device, which is configured to implement the operating method.

BACKGROUND

It is known to equip electronic switching devices such as soft starters and current converters for cooling the power electronics with electrically driven fans, in order to avoid overheating of the semiconductors and/or to enhance the performance of the device. For example, German Patent Publication No. DE 10 2004 017292 A1 describes a fan for active cooling of a soft starter.

Other types of devices, (e.g., projectors, audio devices, cooling devices), likewise use electrically driven fans for removing the dissipated heat. The term "device" will be used below in general for the different types of devices to be cooled.

If a power supply for supplying power to the device, is to serve simultaneously as a power supply of the electrical fan motor, then on account of the startup current of the fan motor, which amounts to a multiple of the rated current that flows later, the power supply is dimensioned relatively large.

SUMMARY AND DESCRIPTION

The scope of the present disclosure is defined solely by the appended claims and is not affected to any degree by the statements within this description. The present embodiments may obviate one or more of the drawbacks or limitations in the related art.

The underlying object of the present disclosure is to specify an improved method for operating a device fan. Another underlying object of the present disclosure is to specify an improved circuit arrangement for operation of a device fan.

The object is achieved by a method for controlling a voltage present at an electric fan during a startup of the fan. The fan in this case serves to generate a flow of air for cooling a device. The method includes an application of an output voltage of a power supply to the fan, wherein the power supply also serves as a power supply of the device. The method also includes a switching-on and switching-off of the output voltage of the power supply applied to the fan by a switch pulse-width-modulated-controlled by a control unit so that the Root Mean Square (RMS) value of the current flowing through the fan is lower than a startup current of the fan. The object is further achieved by a circuit arrangement for supplying power to an electric fan. The fan serves to generate a flow of air for cooling a device. The circuit arrangement includes electrical contacts for connecting the fan to a power supply that serves as the power supply of the device. The circuit arrangement also includes a switch connected in series with the fan for switching on and switching off the fan current flowing through the fan, wherein the switch may be opened and closed alternately by a pulse-width-modulated setting signal. The circuit arrangement also includes a control unit for providing a pulse-width-modulated setting signal at the switch so that the RMS value of the current flowing through the fan is lower than a startup current of the fan.

The RMS value is to be understood as the root mean square of the pulse-width-modulated current value, which represents a physical value able to be varied over time. The abbreviation RMS stands for Root Mean Square.

The switch may be a switching element or logic switch, e.g., may be embodied as a transistor, also called a switching transistor.

The electrically driven fan, or electric fan for short, has a rotor, (e.g., a number of fan blades attached to a rotatable shaft), and an electric motor for driving the rotor. Application of an electrical voltage operates the electric motor of the fan. The abbreviated expression "application of a voltage to the fan" means that an electrical voltage is applied to the electric motor of the fan. The current of the fan is a current flowing through a fan motor, e.g., an electric motor of the fan, or more precisely, the current flowing through line windings of the fan motor, for example, which flows after application of a voltage to the fan motor. The electric fan creates a flow of air for cooling a device, in particular, the electronics of an electronic switching device such as soft starter, frequency converter, or inverter. The electronics may be control electronics, which may control logic switches of the switching device. This is designed to avoid overheating of the semiconductors and the performance of the device is enhanced. In this case, both the fan and also the device to be cooled, in particular control electronics of the device, are supplied with power from the same power supply. The fan may be integrated into the device.

The method serves to control the voltage present at the electric motor of the fan during a startup of the fan, e.g., while the rotational speed of the fan motor is increasing, in particular, from a standstill. This control is of importance because, when the fan motors are starting up, the fan motors may consume a multiple of the power that they consume during continuous operation, e.g., around three times the power.

By alternately switching on and switching off the output voltage of the power supply applied to the fan with the aid of a switch which is controlled by pulse width modulation by a control unit, the voltage present at the fan motor and thus also the current flowing through the fan motor will be regulated such that the RMS value of the current flowing through the fan is less than or equal to a rated current of the fan.

The disclosure is based on the knowledge that it is possible at the same time to use a power supply that serves to supply power to a device cooled by a fan for supplying power to the fan itself, without the power supply having to be designed larger for the startup power of the fan. By limiting the power consumption of the fan, (e.g., while it is starting up), it is still sufficient to dimension the power supply so that it covers the continuous operating power of the device plus the rated operating power of the fan. Thus, the power supply, in addition to being dimensioned for the continuous current of the device, only has to be dimensioned at a maximum for the rated current of the fan, but not for the startup current of the fan.

The power supply of the fan, which supplies the power electronics of the device via a power supply, (e.g., a universal power supply), which has a wide power supply range,

[e.g., 110 V (−15%) to 240 V (+10%)], has the advantage for the customer of lower variance, which also offers significant advantages for the manufacturer in production, in inventory and in costs. For this reason, the fan or the fans of the device are supplied from the regulated output voltage of the universal power supply and not directly from the supply voltage of the device. This offers the additional advantage of the expected flow of air of the fan not being influenced by supply voltage fluctuations.

Many devices only need a very low power for the control electronics, which is why the power supply may also be designed to be very small. Previously, however, it has been the case that the fan output may significantly influence the design of the power supply here. In particular, when the startup power of the fan is also taken into account, fans may draw almost three times as much power during startup as they do during continuous operation. It may be that the power supply is dimensioned much larger and more expensive. This startup time, until full speed is reached, may last for a few seconds, depending on the fan. Until now, the power supply of the device has had to make available the full power of the fan for this time.

The present disclosure now creates an opportunity for the fan to be operated at the power supply of the device, but for the power supply not have to be designed larger because of the startup power of the fan. The disclosure enables savings to be made in the power supplies of devices that have a fan integrated into them and also to supply the fans with power via the power supply serving as the power supply of the device. The disclosure means that the power supply, in addition to being dimensioned for the continuous current of the device, only has to be dimensioned for a rated current of the fan, but not for the startup current of the fan. This saves costs and space.

In accordance with an embodiment, a maximum value of the current flowing through the fan is less than or equal to twice a rated current of the fan. Thus, the power supply, in addition to being dimensioned for the continuous current of the device, may be dimensioned smaller than previously.

In accordance with a an embodiment, the method includes acquiring a fan voltage present at the fan and calculating the switch-on and switch-off times of the output voltage of the power supply applied to the fan as a function of the acquired fan voltage. The fan voltage is the electrical voltage present at the fan motor. In this case, the switch-on time t_ON and switch-off time t_OFF may be calculated in accordance with the following formulae:

$$t\_ON=(2 \cdot I\_n \cdot L\_D)/U\_L \quad (1)$$

$$t\_OFF=(2 \cdot I\_n \cdot L\_D)/(U\_S+U\_D-U\_L) \quad (2)$$

wherein:
I_n=Rated current of the fan;
L_D=Inductance of the choke;
U_S=Output voltage of the power supply;
U_L=Fan voltage; and
U_D=Flyback diode flux voltage.

In the prior art, if voltage is to be regulated, either the non-smoothed triangular-shaped current is acquired with a high sampling rate and the average value calculated, which requires relatively high computing power, or the current is smoothed with a relatively large choke, which means relatively high space requirements and far higher costs. It is here that the advantage of the embodiment lies: The current is not regulated, but is set. To do this, only an acquisition of a fan voltage present at the fan and a calculation of the switch-on and switch-off times of the output voltage of the power supply applied to the fan as a function of the acquired fan voltage is necessary. With the present disclosure, neither a relatively large choke to smooth the voltage nor a high computing power to sample and to process the unsmoothed current is needed. The voltage at the fan only needs to be measured occasionally. The switch-on and switch-off time are calculated according to Equation 1 and Equation 2 less frequently than the switch is switched. The sole variable input value of the function for keeping the current constant is the fan voltage measured relatively infrequently.

In accordance with an embodiment, the method includes connecting a capacitor in parallel to the fan. In accordance with an embodiment, the circuit arrangement includes a capacitor connected in parallel to the fan. The advantage of this arrangement is that the capacitor stabilizes the fan voltage.

In accordance with an embodiment, the method includes connecting a choke limiting the current increase so that the fan current flowing through the fan also flows through the choke and the switch. In accordance with an embodiment, the circuit arrangement includes a choke connected in series with the fan for limiting a current increase. The advantage in this case is that the choke limits the current increase. High switching frequencies are advantageous in the pulse-width-modulated control of the switch, because the choke limiting a current increase and/or smoothing the current curve may be designed all the smaller, the higher the switching frequency is.

In the prior art, if the current is to be regulated, either the non-smoothed triangular-shaped current is acquired with a high sampling rate and the average value calculated, which requires relatively high computing power, or the current is smoothed with a relatively large choke, which means relatively high space requirements and far higher costs. It is here that the advantage of the embodiment lies: The current is not regulated, but is set. To do this, only an acquisition of a fan voltage present at the fan and a calculation of the switch-on and switch-off times of the output voltage of the power supply applied to the fan as a function of the acquired fan voltage is necessary. With the present disclosure, neither a relatively large choke to smooth the current nor a high computing power to sample and to process the unsmoothed current is needed. The voltage at the fan is smoothed by the capacitor and only needs to be measured occasionally. The switch-on and switch-off time are calculated according to Equation 1 and Equation 2 less frequently than the switch is switched. The sole variable input value of the function for keeping the current constant is the fan voltage measured relatively infrequently.

In accordance with an embodiment, the method includes connecting a current measurement shunt such that the fan current flowing through the fan also flows through the current measurement shunt. In accordance with an embodiment, the circuit arrangement includes a current measurement shunt connected in series with the fan.

The simple expansion of the circuit by a shunt provides the opportunity for using additional advantages of the circuit. To this end the voltage at the shunt is additionally acquired and evaluated by the control. Thus, the power consumption of the fan is also known in continuous operation of the fan and for example a short-circuit supervision, an ease-of-movement supervision may be carried out. A fan current limitation to below the rated current of the fan, e.g., for part-load operation or for energy saving, is also conceivable.

The advantage in this case is that the opportunity is created for a diversity of functions that may be realized through knowledge of the fan current. For example, the current may be limited in the event of a short circuit at the fan or at its supply lead, and thus the rest of the device may continue to be operated, which increases the availability of the system. If it is recognized via the current measurement at the current measurement shunt that the fan is not moving freely or is blocked, the device operator may be warned. In addition, a current limitation may also be realized in continuous operation, in order to regulate the fan current or to save energy.

The task definition outlined is also achieved by a computer program product. The computer program product is embodied so that it may be carried out in a control unit. The computer program product may be embodied so that it may be stored as software or firmware in a memory and executed by a processor. As an alternative or in addition the computer program product may also be embodied at least in part as a hard-wired circuit, for example as an Application-Specific Integrated Circuit (ASIC). The computer program product is embodied to receive measured values, evaluate them and generate commands to components of a circuit arrangement. The computer program product is embodied to implement and carry out at least one form of embodiment of the outlined method for controlling a voltage present at an electrical fan during a startup of the fan. In this case the computer program product may combine all the subfunctions of the method within it, e.g., may be embodied monolithically. As an alternative the computer program product may also be embodied segmented and distribute subfunctions that are carried out on separate hardware to segments in each case. For example, a part of the control method may be carried out in one device, (e.g., a switching device), and another part of the control method in a higher-ranking control unit, such as a Programmable Logic Controller (PLC), a manual parameter-setting device or a computer Cloud.

In accordance with an embodiment, the circuit arrangement includes a flyback diode, which is connected so that, when the switch is open, the choke may drive the current via the flyback diode, a capacitor connected in parallel to the fan and/or the fan. For the fan motor, (e.g., an inductive load), it is namely to be insured that the current may continue to flow when the switch is open. To this end a flyback diode is connected in parallel with the fan motor. Without a flyback diode voltage peaks would arise through the induction voltage when the switch is open, which cause additional problems and may even damage the circuit. The advantage in this case is that the flyback diode, when the inductive direct voltage load of the electric motor of the fan is switched off, protects the switch, which may be embodied as a switching transistor, against an overvoltage. To this end the flyback diode is connected in parallel to the electric motor of the fan, (e.g., to the inductive direct current load), such that it has the output voltage of the power supply supplied to it in the blocking direction.

In one embodiment, a device with an electric fan and a power supply is provided. The device may be a switching device such as a soft starter or current converter. However, the device may also involve an electrical or electronic measuring device such as an oscilloscope or a consumer device such as a PC, a TV or fully-automatic coffee maker. In such cases the electric fan used therein serves to generate a flow of air for cooling the device. And the power supply serves as the power supply of the device. The device includes a circuit arrangement as disclosed herein. In this case, the fan is connected to the power supply via the electrical contacts.

In accordance with an embodiment of the device, the output voltage of the power supply is a direct current (DC) voltage. Of advantage in this case is that dc-voltage fans may be operated. DC-voltage current fans are more readily available on the market than fans for ac voltage operation, so that the choice is greater.

BRIEF DESCRIPTION OF THE DRAWINGS

The disclosure is explained with reference to a number of exemplary embodiments with the aid of the enclosed drawings.

FIG. 1 depicts an example of a first circuit arrangement.

FIG. 2 depicts an example of a further circuit arrangement.

DETAILED DESCRIPTION

Figure 3:
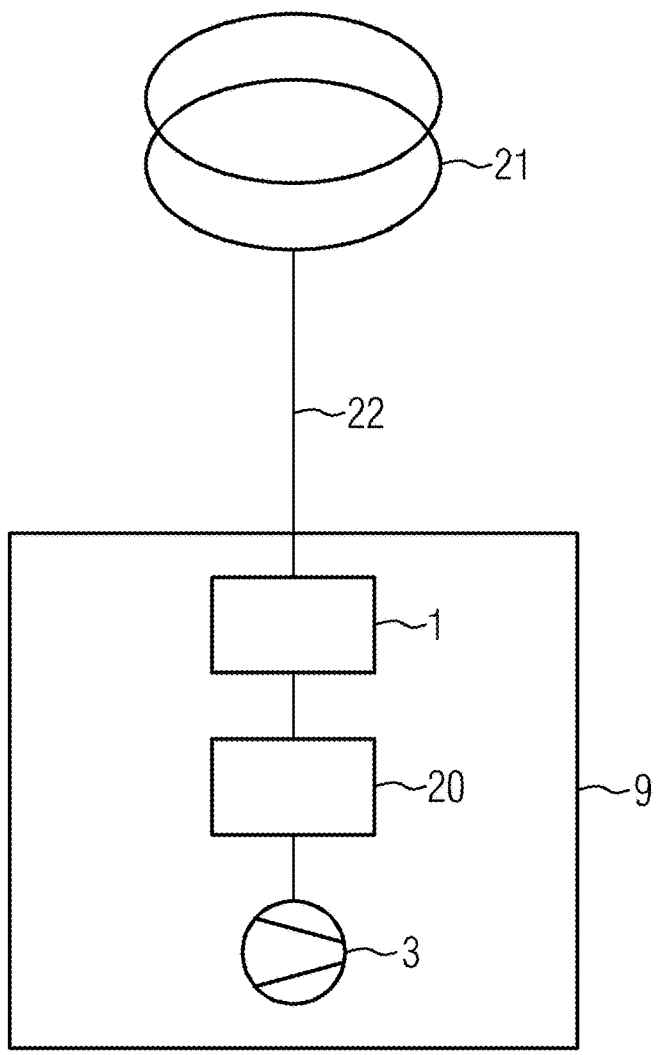
FIG. 3 depicts an example of a switching device.

FIG. 1 depicts a first circuit arrangement 20. A power supply 1 connected on the input side to a power supply network not shown, (e.g., a single-phase or multiphase alternating current system), makes available an output voltage present as a dc voltage on its output side. The output voltage of the power supply 1 is applied to a device, in particular an electronic circuit of the device. The device may be embodied as a switching device, such as a soft starter, in particular, as an electronic switching device. At the same time the output voltage of the power supply 1 is also applied to an electrically driven fan 3, which may be integrated into the device, via electrical contacts 10a, 10b linked to connection points of the power supply 1. The fan 3 is connected to the circuit arrangement 20 via two electrical nodes 12, 14. The fan 3 generates a flow of air for cooling the device, in particular electronic switching elements of the device.

A capacitor 2 is connected between the two electrical nodes 12, 14 and is thus connected in parallel to the fan 3. The capacitor stabilizes the fan voltage. A choke 4, also called a choke coil, is on the one hand connected in series with the fan and on the other with the capacitor. Chokes are coils or inductors for limiting currents in electrical lines, for buffering energy in the form of a magnetic field, for impedance matching or for filtering. By contrast with transformers or resonant circuit inductances, they are usually connected in series with other components or with the loads.

Moreover, a switch 6 for interrupting the current is connected in series with the choke 4. When the switch 6 is closed, current flows from the power supply 1 via a first current path through the fan 3, the choke 4 and the switch 6 back to the power supply 1, and via a second current path through the capacitor 2, the choke 4 and the switch 6 back to the power supply 1.

Connected in parallel to the fan 3 and the choke 4 is a flyback diode 5, which serves to protect against an overvoltage when the inductive dc voltage load of the electric motor of the fan 3 is switched off. To this end the flyback diode 5 is connected in parallel to the inductive dc voltage load of the fan 3 such that it has the output voltage of the power supply 1 applied to it in the blocking direction.

A voltage present at the fan 3 is tapped off at two measurement points, a first measurement point 13 and a second measurement point 15 and transmitted via a first measurement line 91 and a second measurement line 92 to a control unit 7.

Through the fan control, the voltage present at the fan 3 is gradually increased as the fan starts up. The voltage is increased so that, even during the startup of the fan, the RMS value of the current flowing through the fan motor is less than or equal to a rated current of the fan 3.

For example, with a rated current of the fan of 0.5 A and a startup current of the fan of 1.5 A, the RMS value of the current flowing through the fan is limited to 0.5 A. During the switch-on time of the switch 6, the fan current rises to a maximum of twice the rated current; during the switch-off time of the switch 6 the fan current decays completely. Thus, on average, roughly the rated current, (e.g., the continuous operating current), of the fan 3 is produced for the fan current.

The circuit arrangement shown in FIG. 1 is supplied with power by the output voltage of the power supply 1, which is also provided for the remaining control electronics of the device. Usually this output voltage 1 is a dc voltage. This supply voltage 1 is measured by the control unit 7, e.g., by a microcontroller.

For startup of the fan 3 the flow of current is controlled via a PWM controller of the control unit 7 (PWM=pulse-width-modulated; pulse-width modulation), which alternately sends signals for opening and closing it to the switch 6 via a control line 94). To calculate the switch-on and switch-off times of the PWM, the control unit 7 additionally acquires the fan voltage present at the fan 3. For stabilization of this voltage, the capacitor 2 is connected in parallel to the fan 3. The switch-on t_ON and switch-off times t_OFF of the PWM, with which the switch 6 is controlled, are roughly calculated in accordance with Equations 1 and 2, provided above.

Depending on the fan voltage, the pulse-width modulation, (e.g., the switch-on and switch-off time of the switch 6), will be adapted during the startup of the fan by the control unit 7 so that the current flowing remains constant during the entire startup. During the time t_ON the current flows from the power supply 1 via the capacitor 2 and/or the fan 3 as well the choke 4 and the switch 6 back to the power supply 1. The choke 4 here limits the increase in current. The switch-on time is defined in accordance with the above Equation 1 so that a maximum of twice the value of the fan rated current is reached.

During the switch-on time of the switch 6 that may be embodied as a switching transistor, the current increases to a maximum of twice the rated current; during the switch-off time of the switch 6 the current decays completely. Thus, on average, roughly the rated current, (e.g., the continuous operating current), of the fan 3 is produced.

Thereafter, for the period of time t_OFF, the switch-off phase of the switch 6 begins, during which the choke 4 continues to drive the current via the flyback diode 5 and also the capacitor 2 and/or the fan 3. The switch-off time is calculated in accordance with Equation 2, so that the current has completely decayed before the switch 6 is next switched-on. For the sake of safety this calculated switch-off time may be slightly lengthened for this purpose with the aid of a factor.

On average, through this control, the rated current I_n of the fan 3 stored in the formulae Eq. 1 and Eq. 2 flows during the entire startup.

FIG. 2 depicts a second circuit arrangement 20, which corresponds to the first circuit arrangement shown in FIG. 1, but additionally has a current measurement shunt 8. By tapping off a voltage at a second measurement point 15 before the shunt 8 and at a third measurement point 16 after the shunt 8, the voltage dropping at the shunt 8 may be tapped off and transmitted via a second measurement line 92 and a third measurement line 93 to the control unit 7. Thus, for a known resistance of the shunt 8, the current intensity present at the third node 14 may be computed.

The current measurement shunt 8 is not necessary for the function of the circuit arrangement. However, the simple expansion of the circuit arrangement by the current measurement shunt 8 offers the opportunity of utilizing additional advantages of the circuit. To this end, the voltage at the current measurement shunt 8 is additionally acquired by the control unit 7. Thus, the power consumption of the fan 3 is also known in continuous operation of the fan 3. Through an evaluation of the acquired current measurement values, the control unit 7 may carry out a short-circuit supervision or an ease-of-movement supervision.

In a similar way, a restriction of the fan current to below the rated current of the fan 3, (e.g., for a part-load operation of the fan 3 or for energy saving), is also possible.

FIG. 3 depicts a device 9, which is embodied as a switching device. In this case the switching device has logic switches not shown in the figure, by which a supply voltage of a load not shown, (e.g., of an electric motor), which is conveyed via a so-called main circuit, may be switched. The supply voltage provided via the main circuit may amount to 380 V, for example.

The device 9 has an electric fan 3, which serves to generate a flow of air for cooling the device 9. The flow of air may cool an electronic circuit of the device 9, in particular, a control electronics circuit for controlling the logic switches. The device 9 also has a power supply 1, which serves as the power supply of the device 9, (e.g., the power supply of the electronic circuit). In this case, the power supply 1 is switched on the input side via a power line 22 in a so-called control circuit, which supplies the power supply 1 with a control voltage from an electrical network 21, e.g., from a single-phase or multiphase alternating current system. The control voltage provided via the control current circuit may amount to 230 V, for example. The power supply 1 converts the control voltage provided at the electrical network 21 so that the output voltage of the power supply 1 is a DC voltage within a defined voltage range, e.g., a DC voltage of 24 V. The device 9 moreover has a circuit arrangement 20 for supply of power to the electric fan. The circuit arrangement 20 has electrical contacts for electrical connection of the fan 3 to the power supply 1. The circuit arrangement 20 has a switch connected in series with the fan 3 for switching on and switching off the fan current flowing through the fan 3, wherein the switch may be alternately opened and closed by a pulse-width-modulated setting signal. The circuit arrangement 20 also has a control unit for providing a pulse-width-modulated setting signal at the switch, so that on average only the continuous operating current of the fan 3 flows through the fan 3.

Figure 4:
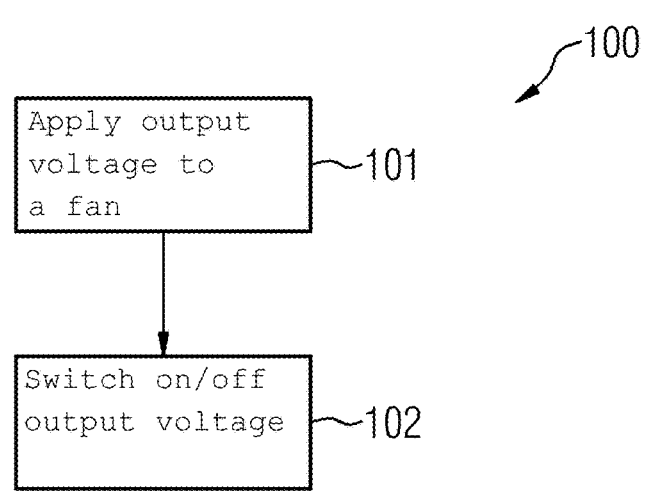
FIG. 4 depicts a flow diagram of a form of embodiment of the method.

FIG. 4 depicts a method 100 for controlling a voltage present at an electric fan during a startup of the fan, wherein the fan serves to generate a flow of air for cooling a device. The method 100 includes the following acts. In act 101, an output voltage of a power supply, which serves as the power supply of the device, is applied to the fan. In act 102, the output voltage of the power supply present at the fan is switched on and switched off by a switch pulse-width-modulated-controlled by a control unit so that the fan is operated with a continuous operating current of the fan.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for controlling a voltage present at an electric fan during a startup of the fan, wherein the fan is configured to generate a flow of air for cooling a device, the method comprising:
   applying an output voltage of a power supply to the fan, wherein the output voltage serves as the power supply of the device;
   acquiring a fan voltage present at the fan;
   calculating switch-on and switch-off times of the output voltage of the power supply applied to the fan as a function of the acquired fan voltage; and
   switching on and switching off the output voltage of the power supply applied to the fan by a switch pulse-width-modulated-controlled by a control unit at the calculated switch-on and switch-off times such that a Root Mean Square value of a current flowing through the fan is less than or equal to a rated current of the fan.

2. The method of claim 1, wherein a maximum value of the current flowing through the fan is less than or equal to twice a rated current of the fan.

3. The method of claim 1, further comprising:
   connecting a capacitor in parallel to the fan for stabilizing the fan voltage.

4. The method of claim 3, further comprising:
   connecting a choke limiting an increase in current such that the current flowing through the fan also flows through the choke and a closed switch.

5. The method of claim 4, further comprising:
   connecting a current measurement shunt such that the current flowing through the fan also flows through the current measurement shunt.

6. The method of claim 1, further comprising:
   connecting a choke limiting an increase in current such that the current flowing through the fan also flows through the choke and a closed switch.

7. The method of claim 1, further comprising:
   connecting a current measurement shunt such that the current flowing through the fan also flows through the current measurement shunt.

8. A circuit arrangement for supplying power to an electric fan, which serves to generate a flow of air for cooling a device, the circuit arrangement comprising: electrical contacts configured to connect the fan to a power supply of the device; a switch connected in series with the fan, wherein the switch is configured to switch on and switch off a current flowing through the fan, wherein the switch is configured to be opened and closed alternately by a pulse-width-modulated setting signal; and a control unit configured to acquire a fan voltage present at the fan, calculate switch-on and switch-off times of an output voltage of the power supply applied to the fan as a function of the acquired fan voltage, and provide the pulse-width-modulated setting signal at the switch based on the calculated switch-on and switch-off times such that a Root Mean Square value of the current flowing through the fan is less than a startup current of the fan.

9. A circuit arrangement of claim 8, further comprising:
   a capacitor connected in parallel to the fan.

10. The circuit arrangement of claim 9, further comprising:
    a choke connected in series with the fan, wherein the choke is configured to limit an increase in current.

11. The circuit arrangement of claim 10, further comprising:
    a flyback diode, wherein the flyback diode is switched so that, when the switch is opened, the choke is configured to continue to drive: the fan, the current via the flyback diode, the capacitor connected in parallel to the fan, or a combination thereof.

12. The circuit arrangement of claim 11, further comprising:
    a current measurement shunt connected in series with the fan.

13. The circuit arrangement of claim 8, further comprising:
    a choke connected in series with the fan, wherein the choke is configured to limit an increase in current.

14. The circuit arrangement of claim 13, further comprising:
    a flyback diode, wherein the flyback diode is switched so that, when the switch is opened, the choke is configured to continue to drive: the fan, the current via the flyback diode, a capacitor connected in parallel to the fan, or a combination thereof.

15. The circuit arrangement of claim 8, further comprising:
    a current measurement shunt connected in series with the fan.

16. A device comprising: an electric fan configured to generate a flow of air to cool the device; a power supply; and a circuit arrangement configured to supply power to the electric fan via the power supply, wherein the circuit arrangement comprises: electrical contacts that connect the electric fan to the power supply; a switch connected in series with the electric fan, wherein the switch is configured to switch on and switch off a current flowing through the fan, wherein the switch is configured to be opened and closed alternately by a pulse-width-modulated setting signal; and a control unit configured to acquire a fan voltage present at the fan, calculate switch-on and switch-off times of an output voltage of the power supply applied to the fan as a function of the acquired fan voltage, and provide the pulse-width-modulated setting signal at the switch based on the calculated switch-on and switch-off times such that a Root Mean Square value of the current flowing through the electric fan is less than a startup current of the electric fan.

17. The device of claim 16, wherein an output voltage of the power supply is a direct current (DC) voltage.

18. The device of claim 16, wherein the device is a switching device.

* * * * *